United States Patent Office 3,095,342
Patented June 25, 1963

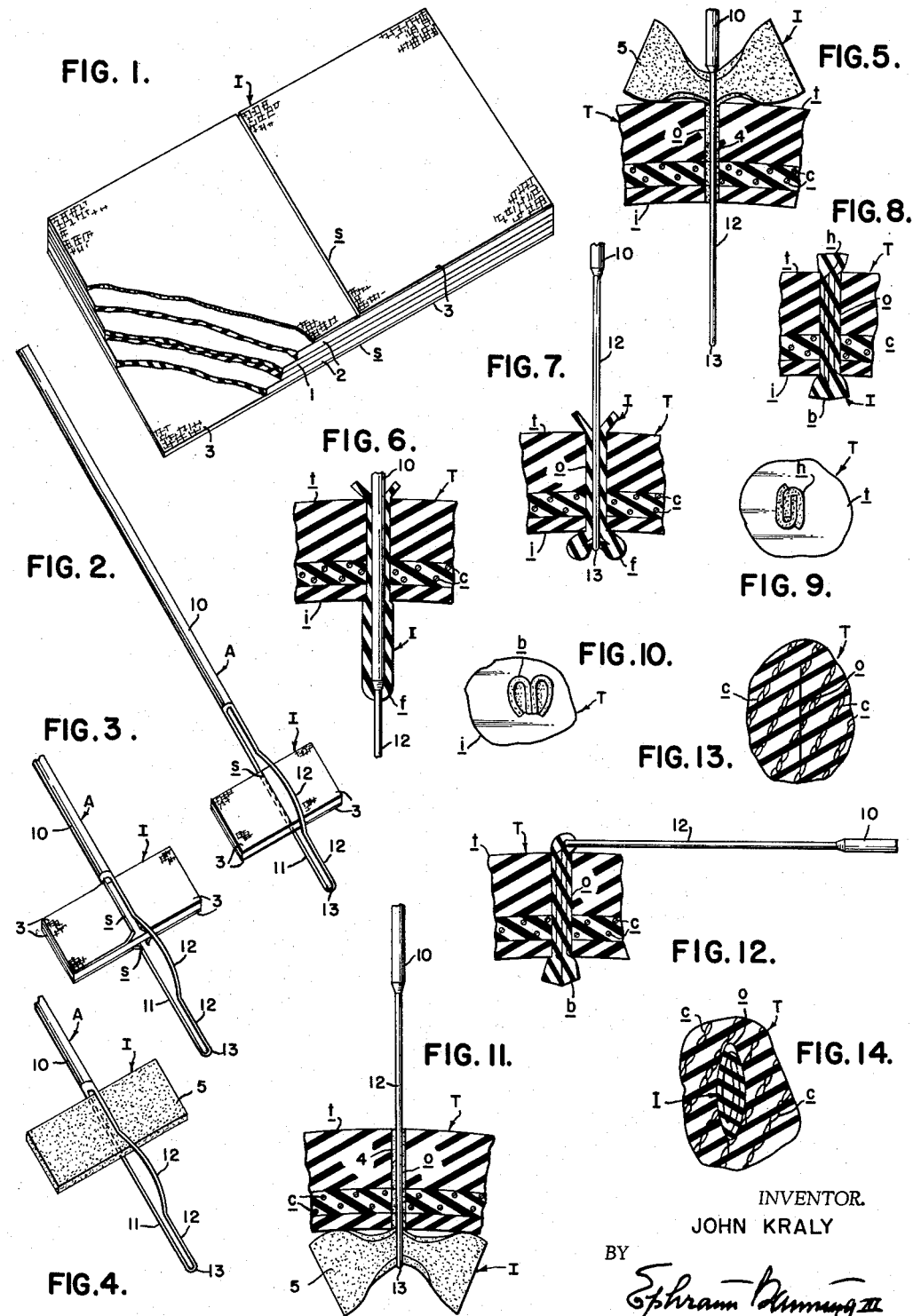

3,095,342
TIRE REPAIR INSERT
John Kraly, 3629 S. 59th Ave., Chicago, Ill.
Filed Dec. 15, 1961, Ser. No. 159,642
9 Claims. (Cl. 156—97)

This invention relates to a sealing insert applicable to the ordinary puncture opening in a vehicle tire, particularly of the inflatable tubeless type. More particularly, it is concerned with such an insert in the form of a wafer, normally flat, which is endowed with a high degree of pliability, flexibility and elasticity, along with adequate tensile strength for a tractive advance, in a stretched and attenuated state, into and through a tire puncture opening where it may then exert an outwardly directed force for maintenance of pressure engagement with every portion of the walls surrounding the opening to provide an effective seal therefor.

An insert having these special properties may be applied to an injury opening from the tread face of the tire without requiring its removal from the wheel whereon it is mounted for road use. The compressive capacity of the insert is such that it may be safely advanced to sealing position without undue pressure being exerted against (1) the walls surrounding the injury opening to be repaired and (2) adjacent reinforcing cords within the tire body, whereby to avoid further damage thereto or rupturing thereof. Its factor of elasticity makes for an insert body potentially so slender as to facilitate its advance into the tire opening with only a minimum of distortion of its walls and of the adjacent cords therewithin. Its flexibility is also such that the flat body of the wafer may be readily double upon itself, when advanced into a tire puncture opening, to provide a leading end portion having a reverse fold and, trailing therefrom, other wing portions which are free to adapt and arrange themselves irregularly in folds or otherwise, thereby to conform with the contour of the walls surrounding the opening and enter into every crack, crevice or irregularity thereof in response to the elasticity inherent in its own body. Such a wafer insert, doubled when introduced into the tire injury opening, remains therein permanently doubled, as contrasted with other inserts of the plug type which are doubled only during the operation of insertion with possible further injury to the opening to be sealed and to the immediately adjacent cords in the tire body.

These desirable attributes of the present insert are due in large part to its unique form and shape which is that of a normally-flat rectangular wafer. They also derive from its composite structure which is multi-ply with laminations of cured and uncured rubber, the latter occupying outside positions. The uncured rubber laminations are pre-conditioned for self-vulcanizing promptly after installation in a tire injury opening so as to become adhesively bonded to the tire walls surrounding the opening, thereby completing a seal therefor that is fully effective and permanent. Although soft, pliable and resilient, ample tensile strength is contributed to the insert body by its cured rubber component which serves as a reinforcing base for support of the facing components of uncured rubber which are joined thereto in unitary relation therewith. In the various aspects just noted, the tire sealing insert of this invention is advantageous and an improvement over comparable repair units of the past. It is also less expensive to produce and install, and it adjusts itself better to injury openings varying widely in contour and size, thereby enabling fewer different sizes of inserts to be used for sealing all of the usual variety of puncture openings requiring repair.

These and other objects and purposes of my invention, as will hereinafter be noted, may be realized from a multi-ply insert of wafer form having the preferred construction described herein, when taken in conjunction with the accompanying drawing which illustrates the present insert, and its application to a tire injury opening, in the manner following:

FIGURE 1 is an enlarged perspective view of a single insert in its normal flat state, complete with divided protecting covers as they appear prior to their removal at the time of use; FIG. 2 is a perspective view of the insert in the initial position which it occupies when first fitted loosely within a preferred form of applicator; FIG. 3 which is a similar view shows the insert slid endwise of the applicator to a clamped position where it may be conveniently grasped for pre-stretching to produce an elongation thereof and loosening of its protecting covers preliminary to their complete removal; FIG. 4 which is a similar view shows the covers removed from the clamped insert and an adhesive cement applied thereto following a dipping operation; FIG. 5 is a fragmentary detail in section through a tire showing in elevation the applicator initially advanced into an injury opening therein, the insert being operatively seated on the applicator ready to be further advanced therewith; FIG. 6 which is a similar view shows the applicator advanced a sufficient distance to carry the insert within and through the tire injury opening, the insert being stretched and doubled upon itself during this advance to extend in part beyond the inner face of the tire; FIG. 7 which is a similar view shows the applicator retracted from the position of FIG. 6 to the point of permitting the folded leading end of the insert, still lying inwardly of the tire inner face, to reverse itself preparatory to its severance at this stage of the operation; FIG. 8 which is a similar view shows the insert in its final sealing position at the conclusion of the operation with the applicator completely withdrawn from the injury opening; FIG. 9 is a fragmentary elevational view of the tire tread showing the outwardly protruded head end portion of the insert prior to its removal, as by clipping or road wear; FIG. 10 which is a view similar to FIG. 9 shows the inner face of the tire with the proximate insert end portion protruded therefrom; FIG. 11 is a fragmentary detail in section through a tire showing the applicator so manipulated as to carry the insert initially through an injury opening and into open space beyond the tire inner face where the insert wings are free to relax outwardly the same as before their insertion into the tire opening; FIG. 12 which is a similar view shows the insert drawn back from the position of FIG. 11 and reversed to lie within the injury opening in sealing position therein, the applicator being then ready to sever the insert at the point of its transverse fold to free the applicator therefrom; FIG. 13 is a fragmentary detail in section through a portion of the tire body immediately adjacent a common slit form of injury opening and transversely thereof; and FIG. 14 which is a similar view shows the walls defining the slitted injury opening spread apart for reception of the insert whose body contour is then conformed exactly thereto.

The term "tire," as used herein, has reference to the usual casing of an inflatable tubeless tire for which the present sealing insert is especially adapted. With a tire having an inner tube, this term would designate the outer casing therefor, and it should be so understood herein. The field of use for the insert of this invention is that now dominated by the so-called tubeless tires for vehicles, hence the description will be confined thereto into the detailed disclosure to follow.

Referring now to FIG. 1, the tire sealing insert I consists essentially of a multi-ply wafer having a resilient lamination 1 of cured rubber or the like forming a base which is arranged between a pair of uncured rubber laminations 2. It will be found both convenient and economical to start with the base assembled between a pair of outer laminations, all of vulcanizable uncured rubber in sheet form, but with the outer laminations containing a suitable inhibitor, such as stannous chloride; then subjecting the entire assembly to a heat treatment whereby to vulcanize the base and permanently bond it to each of the outer laminations while leaving the latter uncured. The multi-ply structure so produced then becomes a single unit that is pliable, elastic, and endowed with a tensile strength that is enhanced appreciably by reason of its united laminations. The exposed tacky faces of the outer laminations are desirably protected, and maintained in a clean and fresh condition, up to the time of use by covers 3 of Holland cloth or the like applied removably to their surfaces. Having completed the unitary assembly of laminations and covers up to this point, the covers are then slitted at s along parallel lines and the multi-ply sheet is severed along two sets of transversely disposed parallel lines to provide a large number of small elongated rectangular wafers each having its covers 3 severed by the slits s providing slight grooves extending transversely thereof at substantially its center point longitudinally thereof.

In commercial embodiments of the invention, the inserts may vary somewhat in size and thickness to meet the diverse conditions of their use. For example, the base lamination may be thickened by uniting two or more thin layers into a single unit. In one suitable size the insert would measure about 1" x ½". While additional laminations of alternately disposed base and uncured rubber components may be used, the arrangement and number just described has proven entirely satisfactory. A desirable minimum thickness for the insert, minus protecting covers, is about .056". The thickness of the base lamination would ordinarily be somewhat greater than that of each outer facing of uncured rubber. A volumetric ratio of 1 to 1 for these two components would also be satisfactory. The composition and volume of the base should be such as to endow the insert with a sufficient tensile strength to withstand the usual disrupting forces encountered during a forcible tractive advance into and through a tire injury opening. A high degree of pliability and elasticity is also important in order that the insert body may readily yield to become attenuated when advanced into the tire puncture opening, but with capacity for exertion of a strong reactive force pressing outwardly against the walls surrounding the said opening. The laminations of uncured rubber 2 are each conditioned for self-vulcanizing by adding thereto some sulfur and an accelerator (desirably of the thiourea family), but only in small amounts of less than 5% each by weight. When subjected to a catalytic reaction, as will presently be explained, the restraining influence of the inhibitor therein will be overcome with the result that the vulcanizing agent in the uncured rubber laminations is activated to induce a self-vulcanization thereof.

One of the most common punctures results from nails or small metal objects entering the tire during its rolling movement over a road. When any such object is withdrawn, the injury opening will often appear to be closed but, when examined carefully, will actually show up as a small crack, slit or split (see FIG. 13). Such a condition prevents maintenance of the desired air pressure in the tire for any extended period, so that a repair operation becomes necessary. The injury opening is usually rough and torn, so should first be cleaned out and smoothed off with a small tool for this purpose. This prepares the way for a more effective sealing of the puncture. It should also be lubricated, as with a spread 4 of self-vulcanizing rubber cement or solvent which serves additionally to adhesively secure in place the insert shortly afterward installed therein. A suitable applicator should also be employed to introduce the insert into the opening so cleaned and lubricated. Such an applicator has heretofore been disclosed in my pending application filed October 23, 1961, under Serial No. 146,818, its title being Tubeless Tire Repair Tool. When the present insert is fitted to such an applicator, or to any other that is suitable for the purpose, it is then pre-stretched (as will presently be explained), its covers 3 are removed, and it is then dipped into a liquid rubber-based cement or solvent which may be the same as that used for lubricating the puncture opening. When done, all surfaces of the outer laminations of uncured rubber will receive a lubricating coating 5 for cooperation with the spread 4 when the insert is fitted into the injury opening.

The self-vulcanizing cement or solvent used in the spreads 4 and 5 desirably contains certain chemicals, one such being zinc ethyl phenyldithiorcarbamate which serves as a secondary accelerator. Due to the intimate contact then established between these two spreads and the exposed outer faces of the uncured rubber laminations 2, the secondary accelerator in the former becomes effective to activate that in the latter to induce a chemical vulcanization thereof. Once started, the accelerator content in the uncured rubber laminations tends to speed the process which is further hastened in response to any applied heat us, for example, that which is generated in a tire as a result of its normal travel over a road.

The applicator A herein shown comprises a shank 10 to be equipped with a suitable handle (not shown), the shank being forked at one end portion to provide a pair of spring wire legs 11 and 12 disposed in closely spaced parallel relation to join at their far ends in a short-radius cutting loop 13. Medially of its ends one leg 12 is bowed at 14 outwardly and away from the other for a limited distance. An insert I in wafer form is freely receivable in the applicator with the grooves of the crosswise slits s of the covers aligned with and disposed between the legs at a point oppositely of the bow 14 (FIG. 2). From this position the insert is then slid endwise of the applicator to a seating position adjacent the shank fork where the two spring legs 11 and 12 engage firmly within the grooves of the slits s to frictionally support the insert centrally of its length (FIG. 3).

At this point the insert is pre-stretched as by grasping its opposite end portions and then pulling rapidly in opposite directions for 5 to 10 times. In this operation an extended intermediate portion of the insert body, probably 50% or more of its entire length, constitutes a free zone which undergoes repeated stretchings to a distance of as much as ten times its original length. No interference to this prestretching is offered by the applicator which remains linearly clamped to the insert at substantially its center point lengthwise thereof. Inasmuch as the insert body is thus subjected to a number of repeated elongations, its hold upon the two split covers 3 is loosened so that, at the conclusion of the operation, both covers are slightly separated from the insert for facile removal therefrom. Pre-stretching, as above described, does two things: (1) it produces a permanent elongation, plus a commensurate attenuation of the insert body, throughout its free zone, and (2) it enables the user to readily remove the four parts of the two insert covers without having to touch the tacky surfaces of the outside laminations 2 at any stage of the insert handling. These beneficial changes in the insert body which are permanent throughout its free zone are attributable to a thermal agitation of the molecular structure of its several components.

Following pre-stretching, the applicator, together with the insert carried thereby, is ready to be dipped in a supply of self-vulcanizing rubber-based cement or solvent to receive the coating 5 thereon (FIG. 4) preliminary to introduction of the insert into a tire injury opening. As indicated in FIG. 5, the insert remains unfolded with its wings oppositely extended up to the point of its tractive entry into the opening o when it is drawn thereinto by the applicator A; as such entry proceeds, however, the pre-stretched central portion of the insert which is seated against the shank end, is folded upon itself at f to lead the advance, the opposite end portions of the insert then forming wings which trail alongside the shank 10 in irregular folds to become stretched and further attenuated with continued advance thereof (FIG. 6). This forward movement ends only when the extreme trailing portions of the insert wings remain exteriorly of the injury opening o, free of confinement thereby so as to form an expanded head h which is greatly enlarged relative to the remainportions of the wings still remaining within the opening. At this point the applicator movement is reversed to permit relaxation of the insert wing portions that are disposed beyond the tire inner face i and, when further retracted to the point of the applicator loop 13 engaging the insert fold f, to reverse the same while crowded against the inner face i of the tire T (FIG. 7). With the insert so positioned, a quick retractive jerk of the applicator will cause its cutting loop 13 to sever the insert along the line of its fold f, thereby freeing the applicator for disengagement from the insert and for complete withdraw from the injury opening o. The insert wing portions immediately adjacent the fold f remain protruded within the open space inwardly of the tire inner face i where they are free for outward expansion to form a ball head b (FIG. 8) which remains engaged with the tire inner face i. Since the two insert heads b and h overlie opposite faces of the tire T in firm engagement therewith, the position of the insert is thereby fixed, and permanently so when supplemented by the already-initiated self-vulcanization of the uncured rubber laminations 2 then taking place concurrently with establishment of an adhesive bond between the insert body and the surrounding walls of the opening o.

In FIGS. 11–12 the same applicator is shown supporting an insert I ready to be installed by an operating technique which follows that already described in connection with FIG. 5, except that the insert is advanced through and beyond the opening o so that its wings lie in open space adjacent the tire inner face i where they are free to expand outwardly, and do so (FIG. 11). At this point the applicator movement is reversed to draw the insert back into the injury opening o, this time starting from its inner end. Once more the insert is constrained to bend upon itself along the transverse fold line f, this time in a reverse direction, and in this condition to draw after itself the insert wings which thereupon undergo an irregular folding and attenuation while advancing outwardly through the injury opening o (FIG. 12). The movement is halted when the fold f at the leading end of the insert emerges slightly from the tread face t of the tire and while remote portions of the trailing wings of the insert still remain within the open space adjacent the tire inner face i, free to expand in the form of a head B for engagement therewith. With the insert so disposed in the opening, the applicator is then given a quick jerk, preferably in a direction which is angular with respect to the axis of the opening o, whereby its cutting loop 13 acts to sever the insert along its fold f so as to free the applicator therefrom. In this operation the insert body portion adjacent its severed fold is drawn out beyond the tread face t of the tire where it expands to form an enlarged head h for engagement therewith. The insert is thereby locked fixedly in place, its securement being augmented by the already-initiated self-vulcanization of the uncured rubber laminations 2 and the concurrent establishment of an adhesive bond between the insert body and the surrounding walls of the opening o.

Two different techniques available for installation of the present insert have been explained by way of example, but it may be advanced otherwise to an effective sealing position within a tire injury opening, a practical and successful way of doing so being indicated in my pending application entitled Tubless Tire Repair Tool, filed January 25, 1961, Serial No. 84,847.

From the preceding description it will be noted that an essential feature of this invention is the production of a composite tire sealing insert in the form of a resilient wafer having a multi-ply structure with outside facings of self-vulcanizing uncured rubber. In use, the capabilities of such an insert are unparalleled. For example, if the insert be originally 1" x ½" in size, with a thickness of .056" (minus covers), and with a 1 to 1 ratio of cured to uncured rubber in its laminated structure, it is possible to apply safely and repeatedly a pre-stretching force sufficient for a ten-fold overall elongation of the insert; when relaxed thereafter, the free zone of the insert, originally about ½" in length, will have become stretched permanently to about ⅞" with a commensurate attenuation thereof whereby its thickness is reduced to about .048". But, when tractively advanced into a tire injury opening, the insert body retains a capacity for again stretching with an ensuing attenuation of down to about .018" in thickness. The tractive force applied to the doubled insert inwardly of its fold during installation of the insert, involves use of an applicator having a shank no greater than .092" in diameter. The maximum thickness of the insert and applicator, during an initial stage only of their advance into the injury opening (FIGS. 12 and 13), is thus twice .018" (for the doubled insert body) plus .092" (for the applicator shank), or a total of .128".

This low figure is important inasmuch as it represents the maximum extent to which the walls surrounding the injury opening will be required to spread apart at any time in order that the present insert may be advanced to its sealing position therein. It is obvious that only a minor strain is imposed upon the body of the tire to enlarge its opening to this small degree, thereby avoiding any further splitting thereof, and that the cords within the tire body adjacent the opening therein need scarcely be touched, much less damaged, during advance of the attenuated insert to its sealing position therewithin. In this connection it is to be noted (1) that it is mainly, if not entirely, the pre-stretched free zone of the insert that is advanced into the injury opening to be further attenuated therein, the unpre-stretched end portions of its wings remaining unconfined and exteriorly of the opening to provide enlarged heads thereat, and (2) that the coating freshly applied to the insert tends to lubricate the wing surfaces, both sides, so as to facilitate their sliding, one upon the other, and both upon the walls surrounding the injury opening. The insert wings are accordingly favored in disposing themselves to best advantage within the opening whereby to occupy every bit of space therewithin, even to the most remote corners and crevices thereof. Because of the factors of high pliability and flexibility present in its multiply pre-stretched structure, an effective seal may be attained with each proper application of the insert to an injury opening. An insert having the general dimensions just noted by way of example, is one that is well suited for use with a common type of tire injury opening. Inserts of other dimensions, but otherwise embodying the features of this invention, will perform equally well and similarly.

It is possible with a sealing insert having a multi-ply structure, as with no other, to attain the high degree of slenderness heretofore noted. This comes about because, for a given volume of insert, the aggregate areas of surface contact between its several components are the maximum possible in a sealing unit comprising both cured and uncured elements in wafer form. As a result, the insert elasticity is enhanced, as is also its stretchability and attenuation whereby its thickness is also reduced. Once advanced to operative position, it there remains indefinitely in its doubled up state to exert a continuing outward pressure in every lateral direction whereby to seal the opening at all points. The present insert, because of its unique properties and structure, is also adaptable for effective use in many tire injury openings varying widely in size and shape, thereby permitting its use in many diverse situations with only a minimum number of different sizes of inserts necessary for such purpose. In fact, in cases of unusually large puncture openings to be repaired, it is possible to provide an effective seal therefor by installing therein more than one insert, preferably sequentially.

After placement of an insert in sealing position within an injury opening, the uncured rubber components are self-vulcanized through both chemical reaction and heat whereby their soft and pliable properties are rapidly firmed up to a consistency approaching that of the cured rubber component, but before this transformation can take place the expansive force then inherent in the attenuated insert body impels a spreading and penetrating movement of the still soft and pliable outer laminations into every crack and crevice of the injury opening. Initial securement of the insert, primarily a mechanical one, results from adhesion of its exterior faces with the interior face of the opening, but this is followed promptly by (1) a chemical reaction between the secondary and primary accelerators in the cement and uncured rubber components, both conditioned for self-vulcanizing, and (2) generation of heat due to tire travel over the road, thereby hastening the process and producing a permanent bond which assures immovable retention for an indefinite period of the insert in its sealing position within the tire injury opening.

I claim:

1. For sealing a tire injury opening, a multi-ply insert in the form of an elastic wafer comprising a unitary assembly of alternately arranged cured and uncured rubber laminations, the former constituting a base having a substantial tensile strength and the latter occupying outside positions on the base to be supported thereby and being self-vulcanizing with both sulfur and a primary accelerator contained therein, and adapted to receive on all exterior faces thereof a spread of self-vulcanizing sealing cement having therein a secondary accelerator content, the insert being folded upon itself into an elongated body wherein its laminations are multiplied in number with the uncured rubber laminations disposed face to face with the self-vulcanizing sealing cement spread therebetween, the folded insert being admissible, folded end first, into a tire injury opening in a compressed state to be tractively advanced therein for the full length thereof while stretched and attenuated to exert an expansive force against the surrounding walls thereof and establish therewith a pressure sealing engagement, the pressure inter engagement of the contacting faces of the uncured rubber laminations with the self-vulcanizing cement spread therebetween acting to produce a chemical reaction between the respective accelerator contents thereof whereby to induce a self-vulcanizing of the uncured rubber laminations and a bonding of each with the other and with the surrounding walls of the injury opening.

2. A tire sealing multi-ply insert according to claim 1 wherein the sulfur and accelerator contents in the uncured rubber laminations are each less than 5% by weight.

3. A wafer form of multi-ply tire repair insert comprising a base lamination of elastic material having a substantial tensile strength, and a facing lamination of soft sealing material united to the base lamination to derive support therefrom and receive thereover an adhesive spread, the base and facing laminations being centrally folded upon themselves as a unit, the facing lamination outermost, to provide side by side wings of substantially equal length with capacity for advance, folded end first, into an adhesive-coated tire injury opening in response to a tractive force exerted against the body of the insert inwardly of its fold, the insert wings being susceptible of elongation, compression and attenuation concurrently with advance of the insert body into the opening to exert therein an outward pressure to assure adhesive securement of the wings to each other and to the walls surrounding the opening, and the folded end portion of the insert, when advanced beyond the far end of the tire injury opening into open space, being free to expand laterally into a head engageable with a substantial area of the proximate tire face to prevent reverse movement of the insert outwardly from the injury opening, the facing lamination consisting essentially of self vulcanizing uncured rubber having an accelerator in its composition and the spreads of adhesive being rubber based and self vulcanizing with a secondary accelerator content adapted, upon contact with the facing lamination when advanced into the opening, to react chemically with the accelerator in the facing lamination to initiate self vulcanization thereof.

4. The method of handling an elongated resilient tire repair insert in the form of a wafer having outer facings of uncured rubber with tacky surfaces to which thin protecting covers are removably applied, comprising the steps of (1) slitting each cover crosswise at substantially its mid point to provide two adjacent sections thereof, (2) applying to the insert covers a clamping pressure confined to a narrow line coincident with the transverse slits thereof, (3) applying to opposite end portions of the insert equal and opposite pulling forces to pre-stretch the insert and, in so doing, loosen its adhesive hold upon all cover sections applied thereto, (4) stripping all cover sections from the insert while so loosened, and (5) advancing the insert while folded upon itself, by a tractive force applied inwardly of its fold, into the injury opening of a tire from the tread face thereof to a sealing position.

5. The method of applying to a tire injury opening an elongated insert in the form of a relatively thin flexible wafer having a substantial tensile strength with opposite facings each protected by a severed outer cover removably applied thereto, comprising the steps, in order, of (1) applying a succession of equal and opposite pulling forces to opposite end portions of the insert to produce a further elongation and attenuation thereof whereby to loosen the adherence of the covers to the opposite facings of the insert for facile stripping of the covers therefrom, (2) applying a coating of adhesive cement to the stripped facings of the insert, (3) then positioning the insert across the tread entrance to the tire injury opening and applying thereto a tractive force directed toward the injury opening to push the insert thereinto while concurrently folding the insert body transversely of itself whereby to provide a pair of side by side trailing wings, (4) continuing application of the tractive force to advance the insert, folded end portion first, with its trailing wing portions undergoing further stretching and attenuating until the leading end portion of the insert has passed through and beyond the injury opening to lie in open space adjacent the tire inner face, the opposite trailing end portions of the insert then protruding in part exteriorly of the tread face of the tire and the compressed intermediate portions of the wings exerting an outwardly directed force against the walls surrounding the opening to become adhesively secured thereto while establishing a seal therefor, and (5) discontinuing application of the tractive force to permit relaxation of the unconfined opposite end portions of the insert and outward lateral expansion thereof into sealing engagement with the proximate tire face.

6. The method of sealing an injury opening in a vehicle tire with a wafer-form of elastic insert, comprising the steps of (1) applying a succession of equal and opposite pulling forces to opposite end portions of the insert to produce an elongation and attenuation thereof, (2) folding the insert body centrally and transversely upon itself to produce a face to face contact of its opposite facings and provide at one end of the insert a reverse fold of its body, (3) applying an adhesive cement spread to the exterior surfaces of the insert body and to the walls of the injury opening interiorly of the tire body to condition the one for bonding to the other when the insert is operatively positioned within the opening, and (4) introducing and advancing the elongated insert body, folded end first, into the tread entrance to the tire injury opening by a tractive force applied inwardly of its folded end portion to form a pair of trailing wings of substantially equal length to be stretched and attenuated within the injury opening concurrently with their advance therein until the folded end portion of the insert has passed therethrough to lie in open space adjacent the tire inner face where it is free to expand laterally into sealing engagement therewith.

7. For application to a tire injury opening, a sealing insert initially in the form of an elongated flexible wafer laminated to comprise a relatively thick resilient base having a substantial tensile strength faced with relatively thin soft rubber laminations united thereto to be supported thereby, a spread of adhesive cement applied to opposite faces of the insert, the insert being folded transversely upon itself at its center to provide two side by side flexible wings adapted for tractive advance, while stretched and attenuated, into the injury opening where they are free to exert an expansive force laterally in all directions to induce through the cement spread a mutual bonding of each with the other and with the walls surrounding the opening to establish a seal therefor, said rubber laminations containing an inhibitor and a first accelerator, said cement containing a second accelerator which will overcome said inhibitor and chemically react with said first accelerator to cause said rubber laminations to become vulcanized to each other and to the side walls of the injury opening in said tire.

8. A tire having an elongated but narrow injury slit filled with a plurality of side by side elongated wide and relatively thin sealing elements joined at one end by an integral fold, each element being resilient and multi-ply, the sealing elements extending generally parallel to the walls of the slit and in a compressed and attentuated state through the slit for its full length and width, the folded end portions of the sealing elements extending beyond the slit and being unconfined for lateral expansion, when relaxed, into locking heads engaging the proximate faces of the tire adjacent said slit, and each sealing element comprising an elastic base and a facing of adhesvie coating of uncured rubber united thereto and in pressure engagement with the adjacent element facings and with the tire walls surrounding the injury opening to establish a sealing connection therewith.

9. In a vehicle tire having a slit extending completely therethrough, a flat repair wafer thin in relation to its width and length, said wafer comprising a base lamination of elastic material having a substantial tensile strength, and facing laminations of soft sealing material united to the base lamination on each side thereof to derive support therefrom, said wafer being folded 180° upon itself at least twice so as to form a repair insert having a thickness several times that of said wafer, the central portion of said insert being attenuated, completely filling said slit and lying generally parallel to the side walls of said slit, sealing cement on said facing laminations so as to secure and seal said central portion to the surfaces of said slit and to secure and seal the opposing outer surfaces of said facing laminations to each other, the size of said central portion being larger than said slit whereby the attenuated central portion expands said slit and is compressed by the surfaces thereof, the ends of said insert projecting beyond said slit and being freely expanded so as to form heads engaging a substantial area of the proximate surface of the tire adjacent said slit to prevent movement of the insert outwardly from said slit.

References Cited in the file of this patent
UNITED STATES PATENTS

| | | |
|---|---|---|
| 553,562 | Mix | Jan. 28, 1896 |
| 1,268,536 | Atwood | June 4, 1918 |
| 2,547,487 | Penny | Apr. 3, 1951 |
| 2,803,284 | Mullen | Aug. 20, 1957 |
| 2,966,189 | Chambers et al. | Dec. 27, 1960 |
| 3,035,626 | Mullen | May 22, 1962 |